US012006452B2

(12) United States Patent
Mikami

(10) Patent No.: US 12,006,452 B2
(45) Date of Patent: Jun. 11, 2024

(54) ADHESIVE SHEET

(71) Applicant: 3M INNOVATIVE PROPERTIES COMPANY, St. Paul, MN (US)

(72) Inventor: Haruyuki Mikami, Tokyo (JP)

(73) Assignee: 3M Innovative Properties Company, St. Paul, MN (US)

( * ) Notice: Subject to any disclaimer, the term of this patent is extended or adjusted under 35 U.S.C. 154(b) by 574 days.

(21) Appl. No.: 17/262,811

(22) PCT Filed: Jul. 25, 2019

(86) PCT No.: PCT/IB2019/056375
§ 371 (c)(1),
(2) Date: Jan. 25, 2021

(87) PCT Pub. No.: WO2020/026094
PCT Pub. Date: Feb. 6, 2020

(65) Prior Publication Data
US 2021/0269677 A1 Sep. 2, 2021

(30) Foreign Application Priority Data
Jul. 31, 2018 (JP) ................................. 2018-143217

(51) Int. Cl.
*C09J 7/10* (2018.01)
*C09J 7/38* (2018.01)

(52) U.S. Cl.
CPC . *C09J 7/10* (2018.01); *C09J 7/38* (2018.01); *C09J 2301/10* (2020.08); *C09J 2301/206* (2020.08); *C09J 2301/208* (2020.08)

(58) Field of Classification Search
CPC ... C09J 7/10; C09J 7/38; C09J 2301/10; C09J 2301/206; C09J 2301/208; C09J 2301/40
See application file for complete search history.

(56) References Cited

U.S. PATENT DOCUMENTS 3,314,838 A 4/1967 Erwin
4,326,004 A * 4/1982 Hefele .................. D06M 17/06
521/88

(Continued)

FOREIGN PATENT DOCUMENTS

CN 107429087 A 12/2017
EP 0429269 5/1991

(Continued)

OTHER PUBLICATIONS

International Search Report for PCT International Application No. PCT/IB2019/056375, dated Dec. 12, 2019, 4 pages.

*Primary Examiner* — Patricia L. Nordmeyer
(74) *Attorney, Agent, or Firm* — Carlos M. Téllez Rodríguez; 3M Innovative Properties Co

(57) ABSTRACT

A pressure sensitive adhesive surface that does not adhere to the adherend and can be positioned by sliding it under low pressure, while it can exert a sufficient adhesive force under a pressure above a certain level. The adhesive sheet includes an adhesive layer with a fine structure on a surface thereof. The fine structure includes a plurality of cone or frustum structures, with the cones or frustums having two or more parts joined to each other via an interface. A first part is present on a top of the cones or frustums and is formed from a non-adhesive or a weak adhesive material, and a second part is present below the first part and is formed from a strong adhesive material.

12 Claims, 11 Drawing Sheets

(56) References Cited

U.S. PATENT DOCUMENTS

| | | |
|---|---|---|
| 5,070,114 A | 12/1991 | Watts |
| 5,141,790 A | 8/1992 | Calhoun et al. |
| 5,296,277 A | 3/1994 | Wilson et al. |
| 5,795,636 A | 8/1998 | Keller et al. |
| 2003/0121586 A1 | 7/2003 | Mitra |
| 2019/0016923 A1 | 1/2019 | Tani |

FOREIGN PATENT DOCUMENTS

| | | |
|---|---|---|
| EP | 0861307 | 9/1998 |
| EP | 1532220 | 5/2005 |
| JP | 3-181578 | 8/1991 |
| JP | 3820538 | 5/2000 |
| JP | 2002-544364 A | 12/2002 |
| JP | 2005-511852 A | 4/2005 |
| JP | 2015108121 | 6/2015 |
| WO | WO 00/069985 A1 | 11/2000 |
| WO | WO 03/050197 A1 | 6/2003 |

* cited by examiner

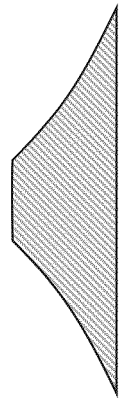
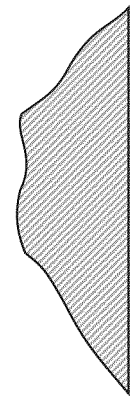
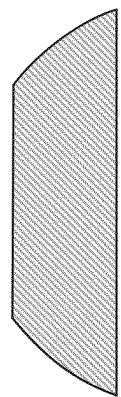
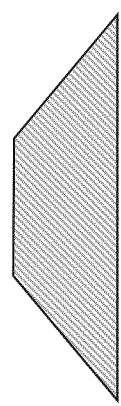
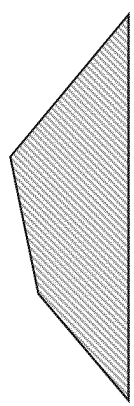

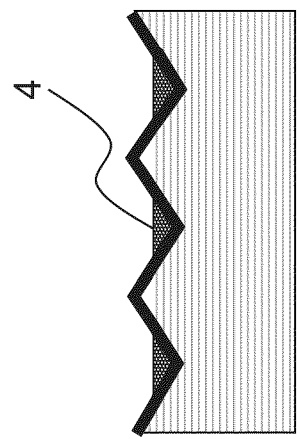
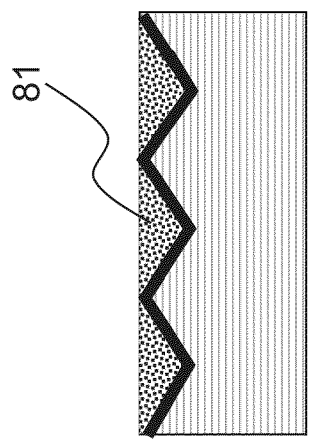
Fig. 9

ADHESIVE SHEET

CROSS REFERENCE TO RELATED APPLICATIONS

This application is a national stage filing under 35 U.S.C. 371 of PCT/IB2019/056375, filed Jul. 25, 2019, which claims the benefit of Japan Application No. 2018-143217, filed Jul. 31, 2018, the disclosures of which are incorporated by reference in their entireties herein.

TECHNICAL FIELD

The present disclosure relates to a layer of adhesive backing a film in sheet, tape or strip form (hereinafter collectively referred to as an "adhesive sheet"), in particular to an adhesive sheet that has high slidability under low pressure, but can exhibit an adhesive force under a pressure above a certain level, and a method for producing the adhesive sheet.

BACKGROUND ART

Adhesive sheets such as decorative sheets (e.g., paint replacement film) backed with a pressure sensitive adhesive surface are difficult to apply to an adherend at a desired position, because adhesiveness is exhibited by just slight contact of the pressure sensitive adhesive surface with the adherend. In order to solve the problem, it has been attempted to provide a pressure sensitive adhesive surface that does not initially adhere to an adherend so it can be positioned by sliding it under low pressure (i.e., has slidability), while it can exert a sufficient adhesive force, when it is under a pressure above a certain level. For example, a technique of dispersing hollow glass microspheres onto the surface of the adhesive layer and a technique of providing non-adhesive projections at a constant interval are known. For example, Patent Document JP 2000-500514 A discloses an adhesive sheet including an adhesive layer having at least two stages of adhesion level, which is produced in such a manner that, for example, the adhesive layer includes a plurality of pegs projecting outward from its surface, and the pegs are covered with a non-adhesive cap.

SUMMARY OF INVENTION

In such known adhesive sheets, slidability of the pressure sensitive adhesive surface is still not sufficient, and further improvements are required of them. In addition, since a particulate material such as glass microspheres is often used, this tends to increase the cost and make the production process complex. Therefore, there is a need for a method of producing an adhesive sheet having high slidability in a simple manner.

The present inventor has discovered that an adhesive sheet having very high slidability under low pressure, while exhibiting a sufficient adhesive strength under a pressure above a certain level, can be provided by forming a fine structure on a surface of an adhesive layer. The fine structure includes a plurality of cone or frustum structures on the surface of the adhesive layer. A first part is present on a top of each or most of the cone or frustum structures, where the first part is made from a non-adhesive or weak adhesive material. The cone or frustum structures also include a second part present below the first part, where the second part is made from a strong adhesive material. The following are certain aspects of the present disclosure.

(1) An adhesive sheet including an adhesive layer with a fine structure on a surface thereof, the fine structure including a plurality of cone or frustum structures, the cones or frustums having two or more parts joined to each other via an interface, a first part present on a top of the cones or frustums being formed from a non-adhesive or a weak adhesive material, a second part present below the first part being formed from a strong adhesive material.

(2) The adhesive sheet according to aspect 1, wherein an angle θ formed between a side surface and a bottom surface of the cones or frustums is 8° or greater.

(3) The adhesive sheet according to aspect 1 or 2, wherein a height of the first part is in the range from 10% to 90% of the cones or frustums when a height of the cones or frustums is 100%.

(4) The adhesive sheet according to any one of aspects 1 to 3, wherein in the fine structure, the longest distance between centers of two adjacent cones or frustums is 300 μm or less.

(5) The adhesive sheet according to any one of aspects 1 to 4, wherein the adhesive sheet includes 16 or more of the cones or frustums per 1 $mm^2$ of the surface of the adhesive layer.

(6) The adhesive sheet according to any one of aspects 1 to 5, wherein the first parts of the cones or frustums contain polyurethane, poly(meth)acrylate, cellulose, silicone, an amine-based resin, a fluororesin, or polyvinyl chloride.

(7) The adhesive sheet according to any one of aspects 1 to 6, wherein the first part of the cone or frustum contains a material having a storage modulus of elasticity (G') of $3 \times 10^5$ Pa or greater as measured at a frequency of 1 Hz at normal temperature.

(8) The adhesive sheet of any one of aspects 1 to 7, wherein the first part and the second part of the cones or frustums are adjacent to each other, and a difference between a refractive index of a material composing the first part and a refractive index of a material composing the second part is within 1%.

(9) The adhesive sheet according to any one of aspects 1 to 8, wherein a dynamic friction coefficient when tested according to JIS K 7125, except that a metal slip piece is used as is, is 1.10 or less.

(10) The adhesive sheet according to any one of aspects 1 to 9, wherein a 180° peeling adhesive strength when tested under conditions of a temperature of 23° C. and a tensile speed of 200 mm/minute is 1.0 N/10 mm or greater after 48 hours of adhesion.

(11) A method of producing an adhesive sheet including an adhesive layer having a fine structure on a surface thereof, the method including: preparing a mold including a fine structure including a plurality of cone or frustum structures; transferring the fine structure of the mold to produce a liner having a fine structure; applying a solution including a non-adhesive or a weak adhesive material to the liner having the fine structure, and then solidifying the solution to form a first part formed from the non-adhesive or the weak adhesive material; and applying a strong adhesive material or a precursor thereof to the liner with the first part formed, to form a second part formed from the strong adhesive material.

The adhesive sheet of the present disclosure can exhibit high slidability under low pressure and a sufficient adhesive force under a pressure above a certain level by providing a fine structure on the surface of its adhesive layer, the fine structure including a plurality of cone or frustum structures containing a non-adhesive or weak adhesive material at the top and a strong adhesive material at the bottom. In addition, the adhesive sheet of the present disclosure can be produced by a simple method of applying a material to a liner including a fine structure.

BRIEF DESCRIPTION OF DRAWINGS

FIGS. 2a to 2f illustrate cross-sectional views of various examples of "frustum" structures according to the present invention.

FIGS. 3a and 3b are diagrams illustrating an example of a fine structure on a surface of an adhesive layer, with FIG. 3a being a top view, and FIG. 3b being a cross-sectional view of a section indicated by A-A' in FIG. 3a.

FIGS. 4a and 4b are diagrams illustrating another example of a fine structure of the surface of an adhesive layer, with FIG. 4a being a top view, and FIG. 4b being a cross-sectional view of a section indicated by B-B' in FIG. 4a.

FIGS. 5a and 5b are each an enlarged view of one of the quadrangular pyramids included in the fine structure of the surface of the adhesive layer illustrated in FIGS. 3a and 3b, with FIG. 5a being a top view, and FIG. 5b being a cross-sectional view of a section indicated by C-C' in FIG. 5a.

FIG. 9 is a diagram schematically illustrating a state in which the solution reserved in the recesses of the fine structure is dried to form a solid, non-adhesive or weak adhesive material serving as a first part.

DESCRIPTION OF EMBODIMENTS

Adhesive Sheet

The adhesive sheet of the present disclosure has a fine structure on a surface of its adhesive layer, the fine structure including a plurality of cone or frustum structures. A cone is a solid figure with any plane figure such as a circle (including an ellipse) or a polygon as the bottom surface, and is formed by connecting all points on the sides of the bottom surface and a point (vertex) not on the plane. Typical examples of cones include circular cones, triangular pyramids, and quadrangular pyramids. FIGS. 1a to 1f illustrate cross-sectional views of various solid figure examples of "cone" structures herein. (a) is a cross-sectional view of a typical cone. However, the "cone" herein includes not only those of FIG. 1a, but also those of FIG. 1b to FIG. 1d having skewed sides, and FIG. 1e having a vertex whose position is deviated from the center of the bottom surface. Therefore, the "cone" also includes those of FIG. 1f having a skewed side and a vertex whose position is deviated from the center of the bottom surface. All the cross sections through the vertex of the cone do not necessarily have the same shape, and may have different shapes.

A frustum is a solid figure formed by partially removing the uppermost part including the vertex from a cone. Typical examples of frustums include conical frustums, triangular frustums, and quadrangular frustums. FIGS. 2a to 2f illustrate cross-sectional views of various solid shape examples of "frustum" structures herein. FIG. 2a is a cross-sectional view of a typical frustum. However, the "frustum" herein includes not only those of FIG. 2a, but also those of FIG. 2b to FIG. 2d having skewed sides. Also, the top surface of the frustum may not be parallel to the bottom surface or may not be planar, and therefore, those of FIG. 2d to FIG. 2f are also included in the "frustum".

Figure 1A:
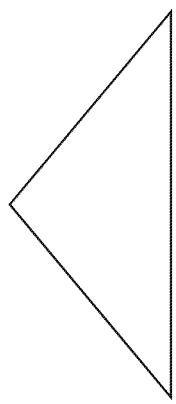
FIGS. 1a to 1f illustrate cross-sectional views of various examples of "cone" structures according to the present invention.
Figure 1B:
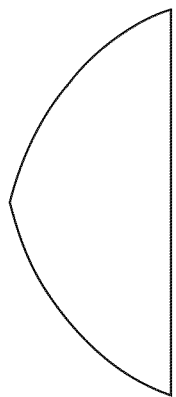
Figure 1C:
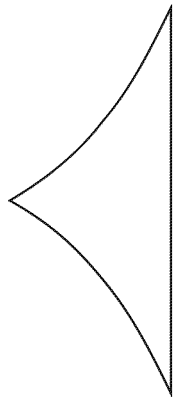
Figure 1D:
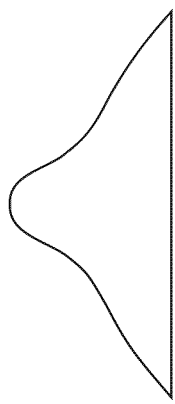
Figure 1E:
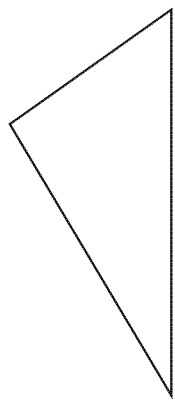
Figure 1F:
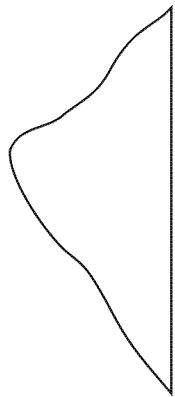
Figure 3A:
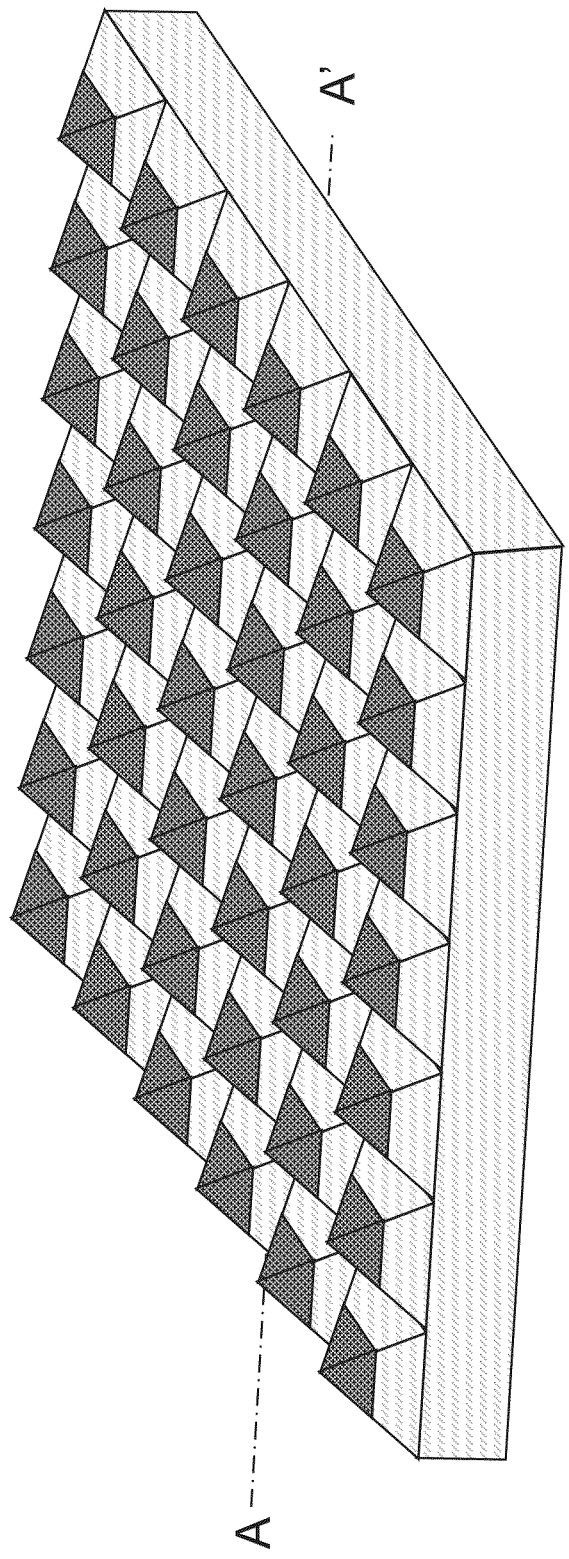
Figure 3B:
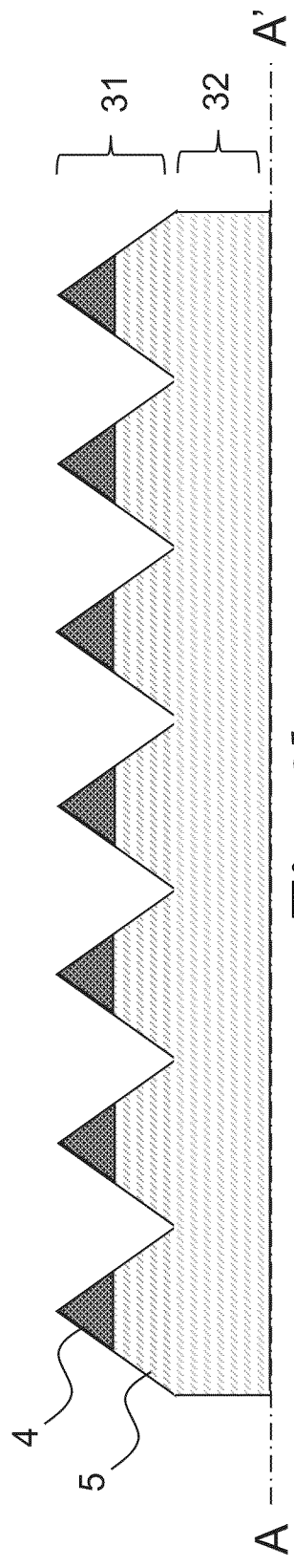
Figure 4A:
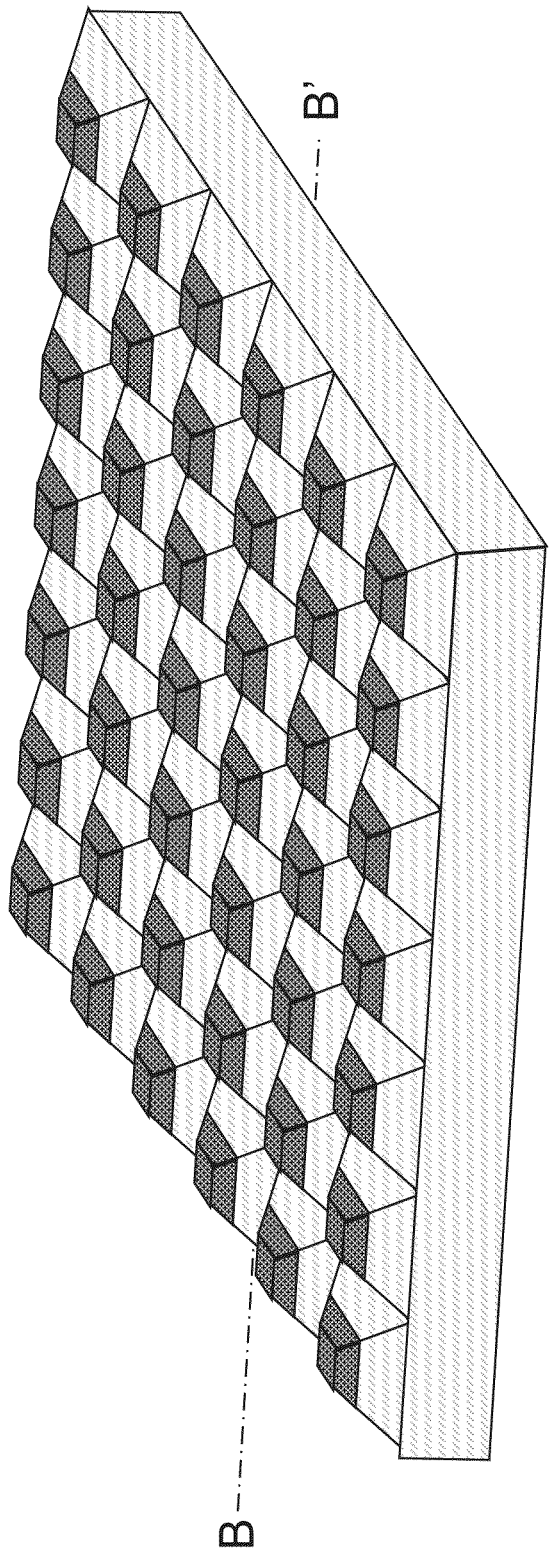
Figure 4B:
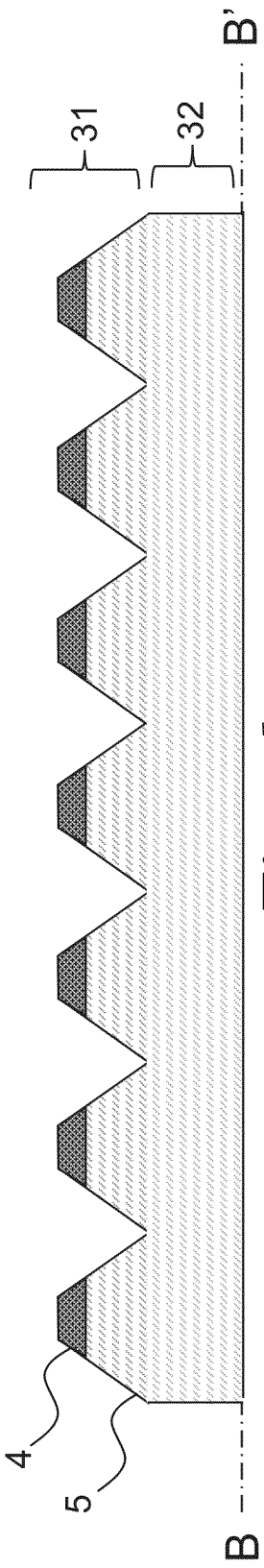

The fine structure has a structure in which a plurality of cone or frustum structures are arranged regularly or irregularly, preferably on a plane. In one embodiment, the fine structure has a structure in which a plurality of cone or frustum structures are regularly aligned at spacings or without spacing between the bottom surfaces. The shapes of the cone or frustum may be the same or different, but preferably have substantially the same height (e.g., within +5%, ±3%, or ±1%), and more preferably all have substantially the same shape. When cones or frustums with different shapes are present, the fine structure preferably includes 10 or less, 9 or less, 8 or less, 7 or less, 6 or less, 5 or less, 4 or less, 3 or less, or 2 or less cone or frustum shapes. Cones and frustums may be present together. FIGS. 3a, 3b, 4a and 4b schematically illustrate examples of the vicinity of the surface of the adhesive layer having the fine structure of the present disclosure. FIGS. 3a and 3b illustrate the surface of the adhesive layer having a structure in which quadrangular pyramids are aligned without spacing, and FIGS. 4a and 4b illustrate the surface of the adhesive layer having a structure in which quadrangular frustums are aligned without spacing.

Each cone or frustum includes two or more parts joined to each other via an interface. "Joined via an interface" means that two matrix phases having different compositions are in contact via a distinct interface. In the present disclosure, the first part (matrix phase) and the second part (matrix phase) are layered and separated as illustrated in FIGS. 3a and 3b and FIGS. 4a and 4b, and are thereby joined via an interface. For example, in the case of a composition in which fine particles are dispersed in a resin, the resin as a substrate corresponds to the matrix phase, while the fine particles correspond to the dispersed phase. The joining via an interface does not include the joining between two phases which have a common matrix phase and are different only in their dispersed phases, or joining manner in which the material varies continuously, for example, in a material in which fine particles are dispersed in a resin, only the density of the fine particles continuously varies in a direction. The interface may be a plane parallel or not parallel to the bottom surface of the cone or frustum. The interface may have a surface which is curved due to, for example, the manufacturing error or surface tension in the production method described below. The cones or frustums may optionally further include a third part, or may have a multilayer structure including three or more layers.

The cones or frustums have at least a first part present at the top and a second part present below the top (i.e., on the bottom surface side). The "top" means a part that substantially occupies a region at the highest position of the cones or frustums (the parts of the cones or frustums that initially contact with the adherend when the adhesive sheet of the present disclosure approaches the adherend). The top preferably includes the vertex of the cone or the top surface of the frustum. The "substantially occupies" means that the cases in which a different material is adhered to or included in only a portion are also included. For example, the first part may occupy a majority (e.g., 90% or more, or 95% or more) of the region in the highest position of the cones or frustums. Even if a small amount of filler or the like is included in the region, the filler or the like does not correspond to the first part. The first part is formed from a non-adhesive or weak adhesive material, and the second part is formed from a strong adhesive material. When the cones or frustums include two parts, a first part formed from a non-adhesive or a weak adhesive material and a second part formed from a strong adhesive material present below the first part are joined to each other via an interface. The first part formed from the non-adhesive or weak adhesive material supports the adhesive sheet when the pressure applied to the adhesive sheet is low, thereby imparting slidability to the adhesive sheet. When a pressure above a certain level is applied to the adhesive sheet, the second part formed from the strong adhesive material contacts with the adherend due to, for example, deformation of the second part itself, deformation of the first part, or incorporation of the first part into the second part, and develops adhesiveness. The terms "non-adhesive", "weak adhesive", and "strong adhesive" mean the relative strength of adhesiveness to the same adherend. Adhesiveness can be evaluated by a known technique such as dynamic viscoelasticity measurement or 180° peeling strength test.

The non-adhesive or weak adhesive material composing the first parts of the cones or frustums preferably has no adhesiveness to the adherend, or is easily releasable from it regardless of adhesiveness. In one embodiment, the non-adhesive or weak adhesive material is a resin having a storage modulus of elasticity (G') of $3 \times 10^5$ Pa or greater, $4 \times 10^5$ Pa or greater, $5 \times 10^5$ Pa or greater, $6 \times 10^5$ Pa or greater, $7 \times 10^5$ Pa or greater, $8 \times 10^5$ Pa or greater, $9 \times 10^5$ Pa or greater, or $1 \times 10^6$ or greater as measured at a frequency of 1 Hz and at normal temperature and calculated by dynamic viscoelasticity measurement. Specific examples include polyurethane, poly (meth)acrylate, cellulose, silicone, an amine-based resin, a fluororesin, and polyvinyl chloride. The non-adhesive or weak adhesive material preferably has a dynamic friction coefficient of 1.10 or less, 1.05 or less, 1.00 or less, 0.95 or less, or 0.90 or less when tested according to JIS K 7125 except that a metal slip piece such as steel material (for example, a SS400 material which may be plated with chrome or the like) is used as is. The non-adhesive or weak adhesive material preferably has high solubility and/or dispersibility in a general purpose solvent, which is either a water miscible solvent such as water or alcohol, or a water immiscible solvent such as hydrocarbon. Furthermore, a solvent that dissolves and/or disperses the non-adhesive or weak adhesive material preferably has a relatively low vapor pressure and is easy to dry. Furthermore, wettability to the mold is preferably also considered. In a case where the wettability is too low, the solvent may not enter the inside of the fine structure, and in a case too high, the solvent may remain between the fine structures.

Known materials used in the production of pressure sensitive adhesives may be used as the strong adhesive material composing the second part. Among them, preferred are those exhibit a relatively strong adhesive force to the adherend, and are not easily releasable. In one embodiment, the strong adhesive material may be defined as a material that meets the so-called Dahlquist criterion, specifically the storage modulus of elasticity (G') is less than about $3 \times 10^5$ Pa as measured at a frequency of 1 Hz and normal temperature. Specific examples include acrylic adhesives, rubber-based adhesives, or silicone-based adhesives. The strong adhesive material may include a tackifier. The non-adhesive or weak adhesive material, and the strong adhesive material preferably have hardness above a certain level so as to maintain the fine structure. For example, the material preferably has a tanδ of 0.8 or less, 0.7 or less, 0.6 or less, 0.5 or less, 0.4 or less, or 0.3 or less as measured at a frequency of 1 Hz and normal temperature.

The combination of the first part and the second part is not limited, but their materials are preferably selected in consideration of the adhesive force between them. For example, from the perspective of affinity of the polymer structure and the like, in a case where the first part is silicone, the second part is preferably a silicone-based adhesive. However, the first part and the second part may not necessarily be the polymers having the same structure.

The adhesive layer of the adhesive sheet of the present disclosure may have a base below the fine structure of the surface. The base is joined or continuous with the bottom surface of the cones or frustums of the fine structure. The material of the base may be the same as or different from the second part. In one embodiment, the cones or frustums are composed of two parts of a first part and a second part, and the base is formed from the same material as the second part, and continuous with the second part. For example, in the embodiments shown in FIGS. 3a, 3b, 4a and 4b, a base (32) is provided under the surface (31) of the adhesive layer, the base being formed from the same material as the second part (5) underlying the first part (4) and continuous with the second part. The thickness of the base may be arbitrarily set depending on the thickness of the desired adhesive layer. In a case where the material of the base is elastic, the cones or frustums in the fine structure can sink into the base, therefore the second parts of the cones or frustums easily contact with the adherend, whereby adhesiveness of the adhesive sheet may be improved.

The entire adhesive layer can be made transparent in a case where any of the non-adhesive or weak adhesive material composing the first part, the strong adhesive material composing the second part, and, if present, the materials composing the other parts is transparent. At this time, in order to reduce visibility of the interface at which the parts are joined, the difference in the refractive index of the materials composing these parts is preferably within 1%. Specifically, if the first part and the second part of the cones or frustums are adjacent to each other and the difference between the refractive index of the material composing the first part and the refractive index of the material composing the second part is within 1%, 0.9%, 0.8%, 0.7%, or 0.6%, the interface between the two parts is generally not visible. For example, when the first part is formed from a transparent acrylic resin and the second part is formed from a transparent acrylic adhesive, the above-described requirement is satisfied, and a completely transparent adhesive layer can be provided. The term "transparent" can be defined by, for example, that the haze is 40% or less as measured in accordance with JIS K 7136.

Figure 5A:
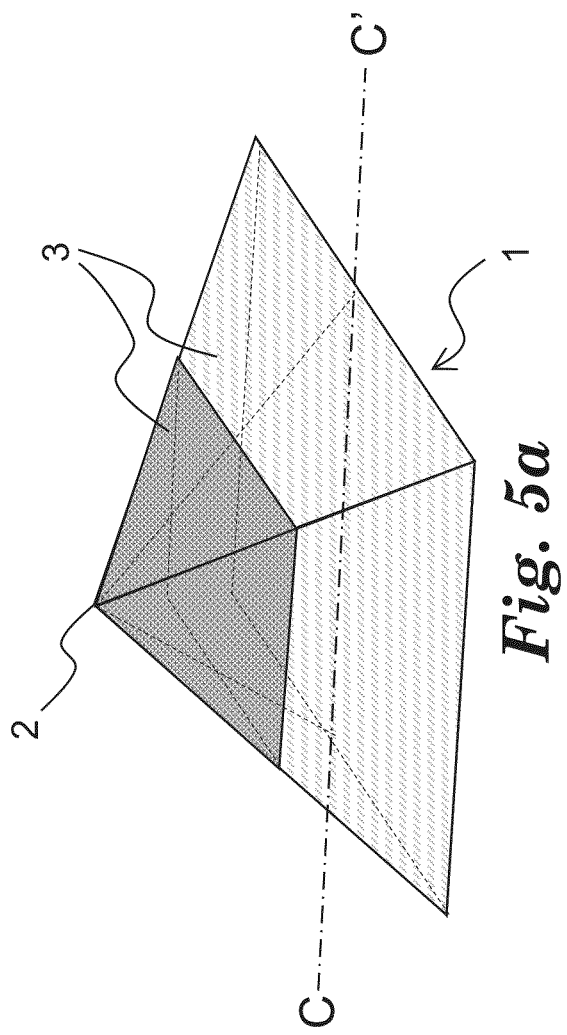
Figure 5B:
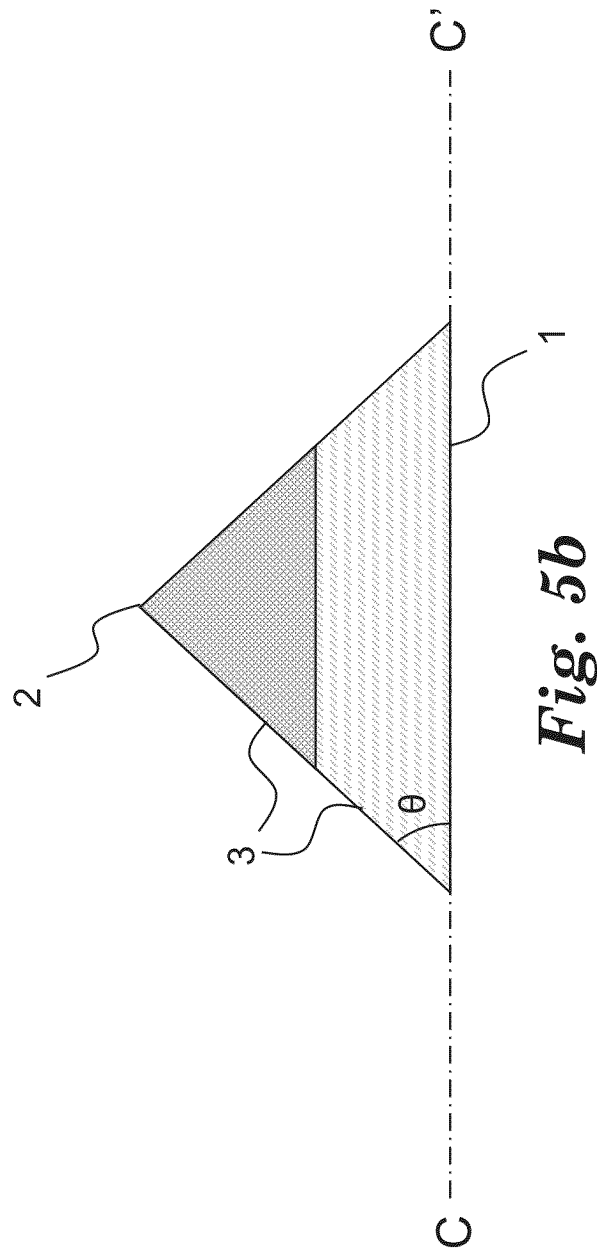

FIGS. 5a and 5b are enlarged views of one of the quadrangular pyramids included in the fine structures on the surface of the adhesive layer illustrated in FIGS. 3a and 3b. FIG. 5a is a top view, and FIG. 5b is a cross-sectional view including the vertex of the cone at the section indicated by C-C' in FIG. 5a. As illustrated in FIGS. 5a and 5b, the cone includes a bottom surface (1) and side surfaces (3) joining the sides of the bottom surface and the vertex (2), and the bottom surface (1) and the side surfaces (3) form an angle θ. Also, a frustum, which is a figure made by partially removing the top of the cone, can define the angle θ between the bottom surface and the side surface. In one embodiment, the angle θ formed by the side surfaces and the bottom surface of the cones or frustums may be 8° or greater, 10° or greater, 15° or greater, 20° or greater, or 25° or greater in any cross-section including the vertex of the cone, from the perspectives of, for example, easiness of formation of the first part and slidability of the adhesive sheet. Furthermore, from the perspective of smoothly releasing the adhesive sheet from the liner, the angle θ may be less than 90°, 85° or less, 80° or less, or 70° or less in any cross-section including the vertex of the cone.

In one embodiment, the first part present at the top of the cones or frustums has a height of 10% or greater, 15% or greater, 20% or greater, 25% or greater, or 30% or greater, and 90% or less, 85% or less, 80% or less, 75% or less, or 70% or less when the overall height of the cones or frustums is 100%. The height is based on the normal direction of the bottom surface of the cones or frustums. In a case where the interface between the first part and the lower portion is a plane or curved surface that is not parallel to the bottom surface, the height is calculated from the average height of the interface as determined based on the normal direction of the bottom surface. When the first part is relatively small, the adhesive sheet has decreased slidability and increased frictional force, but tends to exhibit improved adhesive force when a pressure above a certain level is applied. On the other hand, in a case where the first part is relatively large, the opposite is true.

In one embodiment, in the below-described method of producing an adhesive sheet, from the perspective of, for example, facilitating the formation of the first part, in the cones or frustums included in the fine structure, the longest distance between the centers of two adjacent cones or frustums may be 300 μm or less, 260 μm or less, 220 μm or less, 180 μm or less, 140 μm or less, or 100 μm or less. The centers of the cones or frustums mean the vertex of the cones or the vertex of the corresponding cones of the frustums.

In one embodiment, in the below-described method of producing an adhesive sheet, from the perspective of, for example, facilitating the formation of the first part, the size of the bottom surface of the cones or frustums may be 500 μm or less, 450 μm or less, 400 μm or less, 350 μm or less, 300 μm or less, 250 μm or less, 200 μm or less, 150 μm or less, 100 μm or less, 95 μm or less, 90 μm or less, 85 μm or less, 80 μm or less, 75 μm or less, 70 μm or less, 65 μm or less, 60 μm or less, 55 μm or less, or 50 μm or less. Here, the size of the bottom surface means the length of the longest one of the straight lines connecting any two points on the sides of the bottom surface.

In one embodiment, the height of the cones or frustums is 5 μm or greater and 100 μm or less, 95 μm or less, 90 μm or less, 85 μm or less, 80 μm or less, 75 μm or less, 70 μm or less, 65 μm or less, 60 μm or less, 55 μm or less, or 50 μm or less, from the perspective of, for example, preventing the occurrence of inconvenience in the production process of the adhesive sheet described below, or avoiding difficulty in releasing of the liner from the finished adhesive sheet.

In one embodiment, the number of cones or frustums is preferably 16 or greater, 25 or greater, 36 or greater, 49 or greater, 64 or greater, 81 or greater, or 100 or greater per 1 mm² of the surface of the adhesive layer, from the perspective of providing sufficient slidability. The number of cones or frustums corresponds to the number of cone or frustum centers present in the unit area.

The high density of cones or frustums also contributes to improvement of slidability. The achievement of such density is difficult with a known technique such as the formation of a mold by etching, or dropping or disposition of a foreign substance (non-adhesive beads, resin, or the like) on an adhesive.

The bottom surfaces of two adjacent cones or frustums can be proximate. For example, in the case of a quadrangular pyramid or a quadrangular frustum, or a hexagonal pyramid or hexagonal frustum, the bottom surfaces of two adjacent quadrangular pyramids or quadrangular frustums may be shared on one side, or adjacent sides may be apart at a distance of, for example, 250 μm or less, 200 μm or less, 150 μm or less, 100 μm or less, 50 μm or less, or 10 μm or less. The achievement of such proximity arrangement is difficult with a known technique such as the formation of a mold by etching, or dropping or disposition of a foreign substance (non-adhesive beads, resin, or the like) on an adhesive.

When the fine structure includes frustums, in the method of producing an adhesive sheet described below, the size of the top surface of the frustums is, for example, 50 μm or less, 40 μm or less, 30 μm or less, 20 μm or less, or 10 μm or less, from the perspective of, for example, facilitating the formation of the first part. Here, the size of the top surface refers to the diameter of the top surface in the case of a conical frustum, and the longest length in a straight line joining any two points on the sides of the top surface in the case of a truncated pyramid or other pyramidal frustum. In addition, the reduction of the adhesive force exerted when a pressure above a certain level is applied can be prevented by making the size of the top surface not too large with respect to the bottom surface.

The adhesive sheet of the present disclosure includes an adhesive layer having a surface including the aforementioned fine structure on at least one side. The adhesive layer may be supported by a carrier as needed. Examples of the carrier include a resin film, for example, a film made from ABS, ASA, acrylic, polycarbonate, polyurethane, fluororesin, polypropylene, PET, or PVC. The use of an elastic carrier such as acrylic foam sinks the cones or frustums in the fine structure into the carrier, so that the second parts of the cones or frustums easily contact with the adherend, whereby adhesiveness of the adhesive sheet may be improved. Any layer containing a primer or the like may be included between the carrier and the adhesive layer.

The adhesive sheet of the present disclosure may include an adhesive layer on only one side or adhesive layers on both sides. In a case where both sides have adhesive layers, only one adhesive layer may have a fine structure on its surface, or both adhesive layers may have the same or different fine structures on their surfaces. If both adhesive layers have fine structures on their surfaces, the material or height of their first parts may be the same or different.

The thickness of the adhesive layer may be set as desired depending on the adhesive material used, the intended use of the adhesive sheet, or the like, and may be, for example, in the range from 15 μm to 10 mm. The thickness of the adhesive layer refers to the distance between the highest portion of the cones or frustums and the end of the base opposite to the surface having the fine structure, based on the normal direction of the bottom surface of the cones or frustums.

The adhesive layer may include additional materials other than adhesives, for example, particulates such as hollow or solid glass spheres for the purpose of adjusting adhesiveness. However, the adhesive sheets of the present disclosure can achieve the desired properties without including such additional materials. In one embodiment, the adhesive layer is free of particulates.

Characteristics of Adhesive Sheet

The adhesive sheet according to the present disclosure has sufficient slidability under low pressure, for example, when the pressure applied to the surface of the adhesive layer is 100 g/cm$^2$ or less, 50 g/cm$^2$ or less, 10 g/cm$^2$ or less, or 5 g/cm$^2$ or less. In a preferred embodiment, the adhesive sheet of the present disclosure has a dynamic friction coefficient ($\mu_D$) of 1.10 or less, 1.05 or less, 1.00 or less, 0.95 or less, or 0.90 or less as tested according to JIS K 7125, except that a slip piece made of a metal such as a steel material (for example, an SS400 material that may be plated with chrome or the like) is used. With such a low friction force, the adhesive sheet can be easily slid and aligned while the adhesive sheet is in slight contact with the adherend.

The adhesive sheet of the present disclosure exhibits a sufficient adhesive force to the adherend when a relatively high pressure is applied to the surface of the adhesive layer. In one embodiment, the term "a relatively high pressure" can be defined as the pressure corresponding to such pressure generated by reciprocating a roller of 2 kg at a speed of 300 mm/minute using a compression bonding apparatus defined in 10.2.4 of JIS Z 0237. In another embodiment, the term "a relatively high pressure" can be defined as a pressure of 200 g/cm$^2$ or greater, 300 g/cm$^2$ or greater, 400 g/cm$^2$ or greater, 500 g/cm$^2$ or greater, 600 g/cm$^2$ or greater, or 700 g/cm$^2$ or greater. In a preferred embodiment, the adhesive sheet of the present disclosure has a 180° peel adhesion strength of 1.0 N/10 mm or greater, 2.0 N/10 mm or greater, 3.0 N/10 mm or greater, or 4.0 N/10 mm or greater for a material such as a melamine resin after 48 hours of adhesion as tested under conditions of a temperature of 23° C. and a tensile speed of 200 mm/minute. In a case where such an adhesive force is exerted, the adhesive sheet scarcely causes peeling or the like after adhesion.

Since the adhesive sheet of the present disclosure has a fine structure on the surface of the adhesive layer, the adhesive surface traps few air bubbles when applied to the adherend, and can easily release entrapped bubbles. Such properties are herein referred to as "air releasability." In one embodiment, the surface of the adhesive layer may further have an additional groove-shaped structure for improving air releasability, apart from the aforementioned fine structure.

Production Method of the Adhesive Sheet

A method of producing the adhesive sheet of the present disclosure will be described below. In one embodiment, the adhesive layer of the adhesive sheet of the present disclosure having a fine structure on its surface is made by preparing a mold having a fine structure including a plurality of cone or frustum structures; transferring the fine structure of the mold to make a liner having a fine structure; applying a solution containing a non-adhesive or weak adhesive material to the liner having the fine structure, and then solidifying the solution to form a first part made of the non-adhesive or weak adhesive material; and applying a strong adhesive material or its precursor to the liner with the first part formed, to form a second part made of the strong adhesive material.

Preparation of Mold

Figure 6:
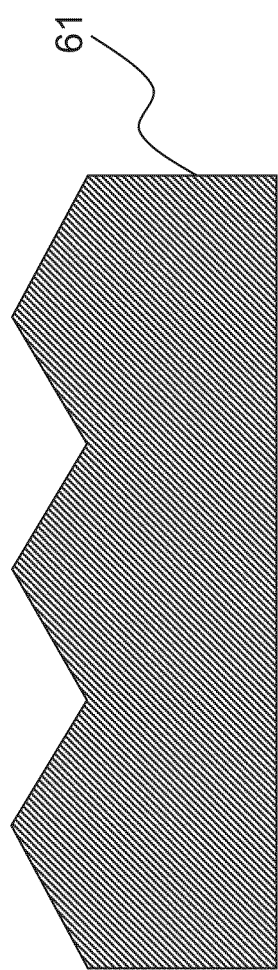
FIG. 6 is a diagram schematically illustrating a cross-sectional shape of a portion of a mold.

Firstly, a mold having a fine structure including a plurality of cone or frustum structures on its surface is prepared. FIG. 6 schematically illustrates a cross-sectional shape of a portion of a mold. A mold (61) can be made by machining a flat plate made of a material such as a metal or resin through a method using a diamond cutter or laser. The fine structure formed on the surface of the mold is substantially identical to the fine structure formed on the surface of the adhesive layer. The difference of the size between their fine structures is preferably within ±5%, within ±3%, or within ±1%. However, with respect to the height of the cone or frustum structures, a greater difference may be caused by the effects of shrinkage of the second part and gravity. The size of the fine structure on the surface of the adhesive layer refers to that immediately after releasing the liner, for example, within 5 minutes or within 3 minutes.

Production of Liner

Figure 7:
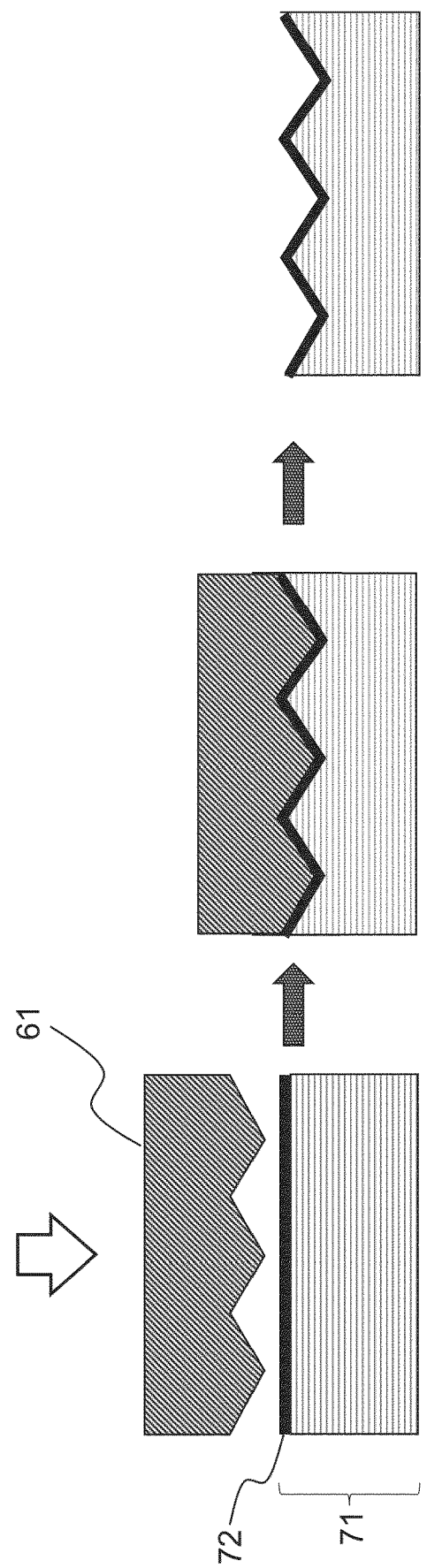
FIG. 7 is a diagram schematically illustrating a procedure for pressing a mold against a liner to transfer the fine structure on the surface of the mold to the liner.

Subsequently, the mold is pressed against the liner to transfer the fine structure of the mold surface to the liner. FIG. 7 schematically illustrates the procedure. The material of a liner (71) is not particularly limited as long as the material is capable of transferring and retaining the fine structure. As an example, a resin is laminated on the surface of a sheet made of a resin or paper, and a release coating (72) is further applied with silicone or the like to form a release surface. The transfer of the fine structure can be achieved by, for example, applying a mold to the surface of the liner, followed by heat pressing. The transfer allows formation of a structure complementary to the fine structure of the mold, i.e., a structure having a plurality of cone or frustum recesses, on the surface of the liner.

Adhesive Layer: Formation of First Part

Figure 8:
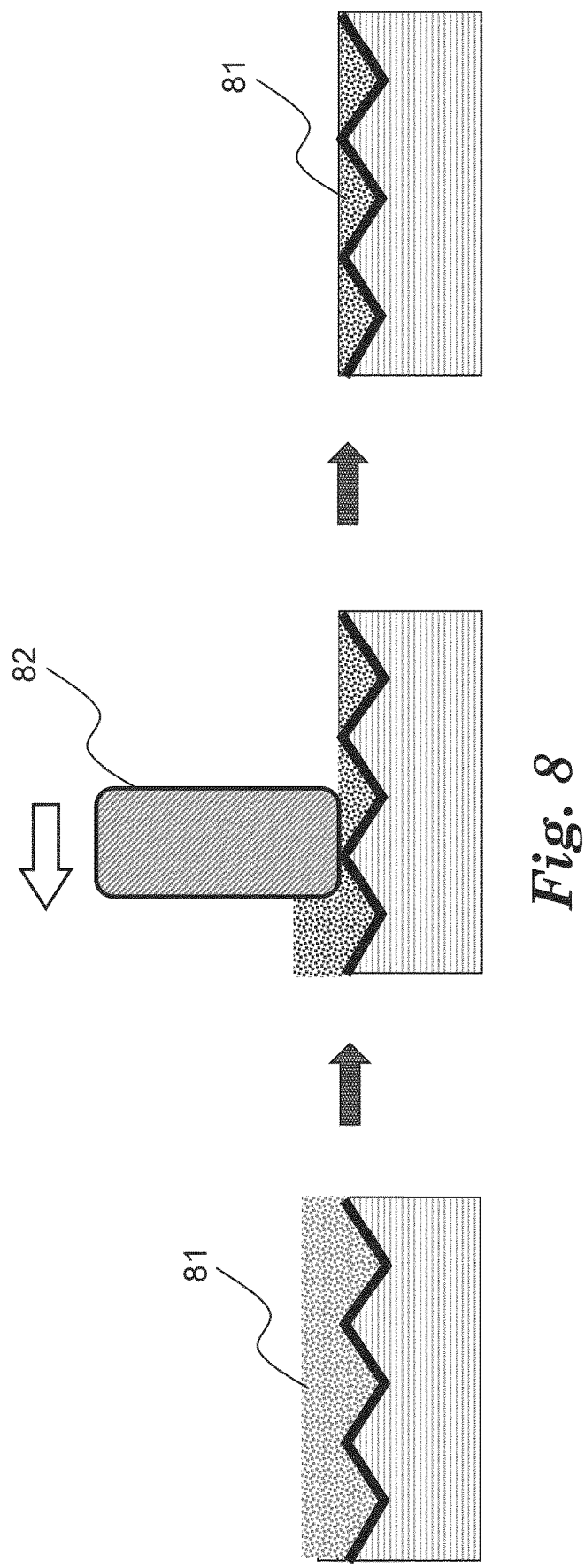
FIG. 8 is a diagram schematically illustrating a procedure including applying a solution containing a non-adhesive or weak adhesive material to the fine structure formed on the surface of a liner, and scraping off the excess solution.

Subsequently, a solution containing a non-adhesive or weak adhesive material is applied to the fine structure formed on the surface of the liner by, for example, coating or spraying, and the excess solution is scraped off by a doctor blade or a squeegee. FIG. 8 schematically illustrates a procedure for applying the solution containing a non-adhesive or weak adhesive material to the fine structure formed on the surface of the liner, and scraping off the excess solution. In the fine structure formed on the surface of the liner, the recesses are preferably in proximity with each other, thereby making it easy to scrape off the solution. After scraping, the solution is reserved in the recesses formed in the surface of the liner. Subsequently, the solution is dried to remove the solvent, whereby a liner in which the solid, non-adhesive or weak adhesive material as the first part is disposed at the bottom of each recess is obtained. FIG. 9 schematically illustrates a manner in which a solution (81) reserved in the recesses is dried to form a solid, non-adhesive or weak adhesive material as a first part (4). After drying, as necessary, the non-adhesive or weak adhesive material may be cured by irradiation with, for example, ultraviolet ray or electron beam. In one embodiment, as shown in FIG. 9, the solid, non-adhesive or weak adhesive material as the first part occupies the space from the bottom to the partway of the mold, and has a surface on the top side that is substantially parallel to the horizontal plane determined by the placement of the mold in drying. In the mold used in producing the liner, in a case where the angle θ formed by the side surfaces and the bottom surface of the cones or frustums is too small, or in a case where the distance between the bottom surfaces of the cones or frustums is too large, it is difficult to drop the solution containing the non-adhesive or weak adhesive material to the bottom of the recesses, which may make it difficult to form the first part. The solution is made by dissolving and/or dispersing a resin such as polyurethane, poly (meth)acrylate, cellulose, silicone, an amine-based resin, a fluororesin, or polyvinyl chloride in an appropriate solvent. The solvent used in the solution may also affect the aforementioned scraping of the solution. For example, when a solvent such as ethyl acetate, methyl ethyl ketone, methyl isobutyl ketone, or the like is used, the distance between the bottom surfaces of the cones or frustums in the mold is preferably more proximate (e.g. 50 μm or less).

Adhesive Layer: Formation of Second Part

A strong adhesive material or it precursor is applied to the liner with the first part formed, to form a second part, thereby forming an adhesive layer. In a case where any other part is present between the first part and the second part, the second part is formed after the formation of the first part and the any other part. The application of the strong adhesive material can be performed in a variety of ways. For example, a strong adhesive material that has been formed into a sheet shape or the like is attached to the fine structure surface of the liner, and flows and enters into the recesses in the surface of the liner by applying heat and/or a pressure, or standing at normal temperature and normal pressure for a period of time or longer, and joined to the first part at the bottom of the recesses. In another example, a precursor that can be converted into a strong adhesive material through curing by irradiation with an energy ray such as ultraviolet ray or electron beam is applied to the fine structure surface of the liner to enter into the recesses, followed by irradiation with an energy ray. In another example, a solution of a strong adhesive material is applied to the fine structure surface of the liner to enter into the recesses, then heated as necessary, and dried to remove the solvent.

Figure 10:
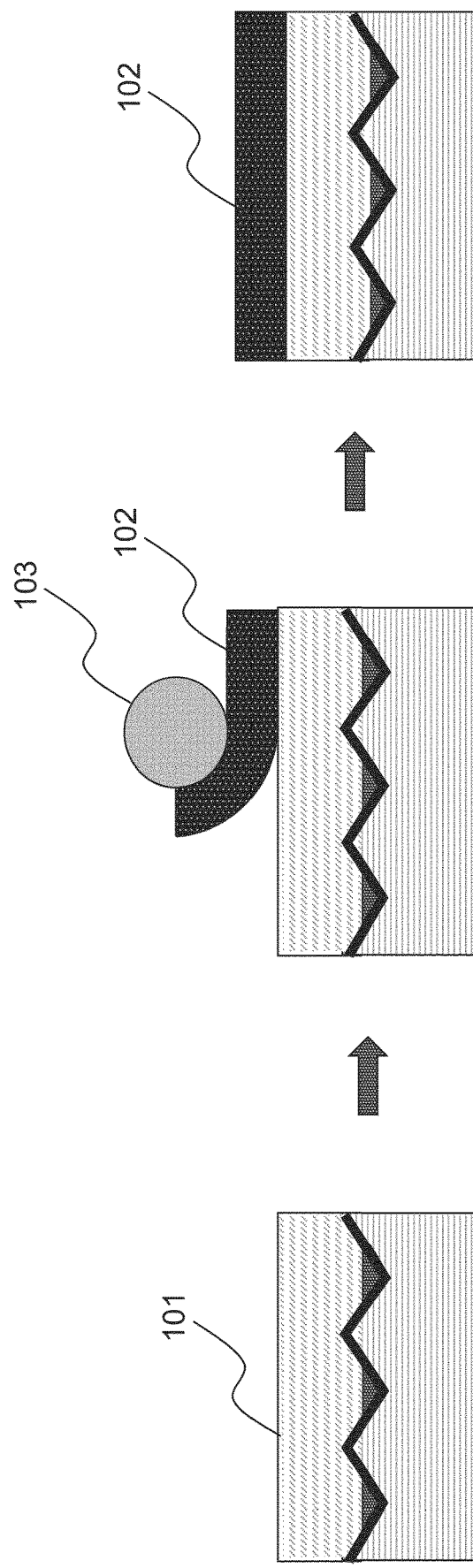
FIG. 10 is a diagram schematically illustrating a procedure for applying a strong adhesive material or a precursor thereof to a liner with the first part formed, and further laminating a carrier.

An article, obtained by the aforementioned steps, including an adhesive layer, which includes the first part and the second part, formed on the fine structure surface of a liner, may be made into an adhesive sheet having a pressure sensitive adhesive surface on only one side, for example, by laminating a carrier such as a PVC film on the article. FIG. 10 schematically illustrates a procedure for applying a strong adhesive material or its precursor (101) to the liner with the first part formed, and further laminating a carrier (102) thereon. When another liner is laminated in place of the carrier, an adhesive sheet having pressure sensitive adhesive surfaces on both sides is obtained. At this time, in a case where the aforementioned liner with the first part formed is used, the adhesive sheet obtained has adhesive layers with a fine structure on both surfaces.

Figure 11:
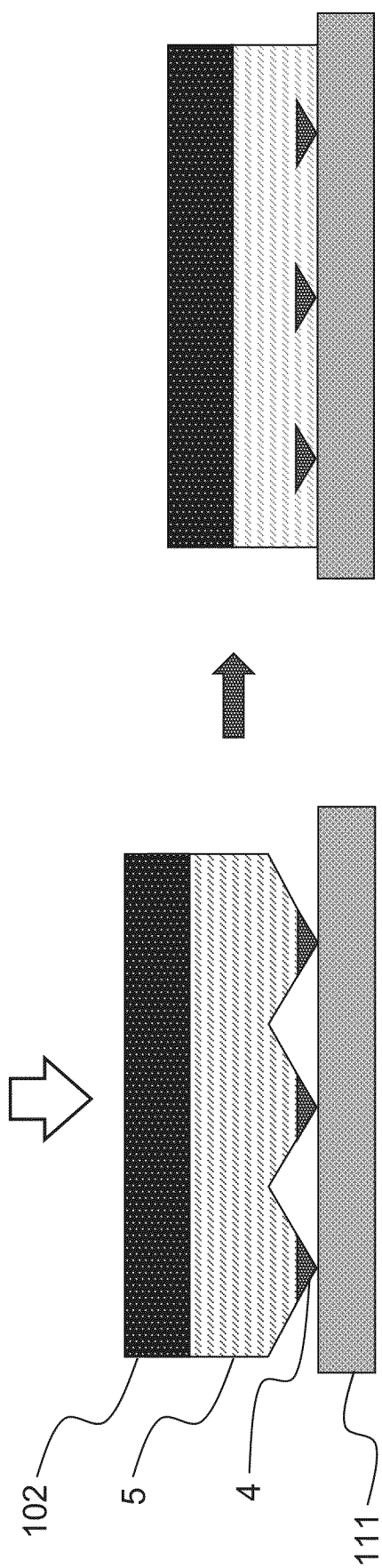
FIG. 11 is a diagram schematically illustrating the behavior of the fine structure surface when the adhesive sheet that has been peeled from a liner is adhered to an adherend.

When the adhesive sheet thus obtained is released from the liner and brought into contact with the adherend, the first part holds the adhesive sheet and the second part will not or slightly contact with the adherend while the pressure applied to the pressure sensitive adhesive surface is low. This allows the adhesive sheet to have slidability under low pressure. On the other hand, in a case where a pressure above a certain level is applied, the second part contacts with the adherend because of, for example, deformation of the second part itself, deformation of the first part, or incorporation of the first part into the second part, and this allows the adhesive sheet to exert an adhesive force. FIG. 11 schematically illustrates the behavior of a fine structure surface when an adhesive sheet released from a liner is attached to the adherend.

In another embodiment, the present disclosure relates to an article including a liner having a fine structure on its release surface, and an adhesive sheet having a fine structure complementary to the fine structure of the liner on the surface of the adhesive layer. Furthermore, in another embodiment, the present disclosure relates to a liner having a fine structure on its release surface, the fine structure including recesses composed of a plurality of cone or frustum structures. The liner having a fine structure on its release surface may have a non-adhesive or weak adhesive material disposed at the bottom of the recesses. In another embodiment, the present disclosure relates to a mold for producing such liner, the mold having a fine structure including a plurality of cone or frustum structures on a surface thereof. Details such as the fine structure are described above.

EXAMPLES

The present disclosure will be described more specifically below using examples, but the present disclosure is not intended to be limited to the examples.

Evaluation Method

Slidability

A sample was cut to a size of approximately 2.5 cm×approximately 7.5 cm, and one end of the sample after releasing a liner was griped, and placed while hanging on a horizontally disposed flat glass plate in such a manner that the pressure sensitive adhesive surface is in contact with the plate. After maintaining this state for approximately 10 seconds, the end of the sample was lifted and pulled horizontally. The behavior at that time was evaluated according to the following criteria, and those achieved a score of 1 or more were judged as slidable.

3: Sample slides freely
2: Sample has resistance, but slides easily
1: Sample has strong resistance and is hard to slide
0: Sample cannot slide Air Releasability A sample was cut to a size of approximately 2.5 cm×approximately 7.5 cm, one end of the sample after releasing the liner was griped, and placed while hanging on a horizontally disposed flat glass plate in such a manner that the pressure sensitive adhesive surface is in contact with the plate. After maintaining this state for approximately 10 seconds, each end of the sample was pressed to apply a stress of approximately 500 g from the top, and the edge of the sample (the region within approximately 0.5 cm from the end) was uniformly contacted with the glass plate. Subsequently, a pressure was applied by a finger toward the edge and center of the sample, thereby preventing peeling of the sample or movement of the entire air pocket toward the end. The bubbles captured in the sample were visually observed in this state.

Refractive Index

The resin composing the first part and the resin composing the adhesive layer were measured using a refractometer (available from Atago Co., Ltd.).

Visibility of First Part

The sample after releasing the liner was placed on a transparent glass plate so that the pressure sensitive adhesive surface was in contact with the plate, and attached thereto at a temperature of 50° C. under a pressure of 2 kg/cm$^2$ using a heat laminator. Whether the first part was visible or not was determined by observing the sample with a microscope from the glass side.

180° Peel Adhesion Strength

A sample cut to a width of 10 mm and a length of 100 mm was prepared. After releasing the liner, the sample was bonded under pressure to a plate having a melamine coated surface using a squeegee in such a manner that the pressure sensitive adhesive surface was in contact with the plate. After standing at normal temperature for 48 hours, a 180° peeling test was performed under conditions of a temperature of 23° C. and a tensile speed of 200 mm/minute.

Size of First Part

The pressure sensitive adhesive surface of the sample after releasing the liner was observed using a high precision microscope. Among the square pyramid or square frustum structures formed on the pressure sensitive adhesive surface, the one having the most clear image was selected for observation, and the overall height (in normal direction), the overall bottom surface size, and the bottom surface size of the first part were measured for one location. Based on the measured data, the ratio of the height of the first part with respect to the overall height was calculated.

Evaluation of Slidability Based on Dynamic Friction Coefficient

The measurement was carried out according to JIS K 7125, except for a slip piece. A sample cut to a width of 80 mm and a length of 150 mm was prepared. A sample after releasing the liner was placed on a table of a slip/peel tester (TSH-1202-50N, IMASS) with the pressure sensitive adhesive surface upward, and a 200 g rolled steel plate with a general structure (SS400, plated with chrome) was placed thereon as a slip piece. The slip piece was pulled at a speed of 1000 mm/minute, and its kinetic friction force ($F_D$) was measured by a load cell. From the measurement results, the dynamic friction coefficient ($H_D$) was calculated according to the following equation.

$$\mu_D = F_D / F_P$$

$F_D$: dynamic friction force (N)

$F_P$: normal force (N) (=1.96 N)

Production and Evaluation of Sample

Production Example 1

(1) Production of Mold Having Fine Structure

A mold having a plurality of uniformly arranged square pyramid or square frustum structures was made by processing a flat plate of a resin or metal. Laser processing was used for the resin, and processing with a diamond cutter was used for the metal. The size of the square pyramid or square frustum structures in each mold is shown in Table 1. The size was measured by observing the surface of the mold using a high precision microscope, and the observed one square pyramid or square frustum structure having the most clear image was selected for measurement.

TABLE 1

Figure 12:
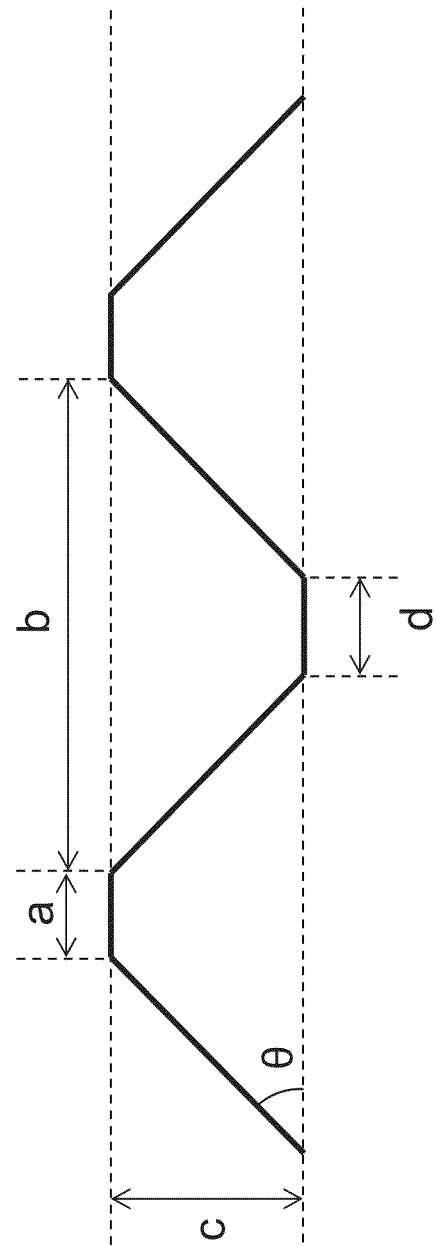
FIG. 12 is a diagram schematically illustrating dimensions for the molds of Table 1.

See FIG. 12 for an explanation of the different dimensions in this table.

| Mold ID | Material | Angle ($\theta$) (°) | Top (a) (μm) | Between tops (b) (μm) | Height (c) (μm) | Cone/frustum distance (d) (μm) | Interval (a + b) (μm) |
|---|---|---|---|---|---|---|---|
| A | Resin | 3.0 | 0.0 | 499.4 | 13.1 | 0.0 | 499.4 |
| B | Resin | 20.7 | 12.1 | 84.6 | 16.0 | 0.0 | 96.7 |
| C | Resin | 48.5 | 9.1 | 36.3 | 16.8 | 7.0 | 45.3 |
| D | Resin | 56.1 | 7.8 | 19.7 | 12.7 | 3.0 | 27.5 |
| E | Resin | 66.3 | 6.3 | 9.8 | 8.6 | 2.0 | 16.1 |
| F | Metal | 28.2 | 0.0 | 45.3 | 12.2 | 0.0 | 45.3 |
| G | Metal | 29.0 | 0.0 | 90.9 | 25.2 | 0.0 | 90.9 |
| H | Metal | 9.6 | 0.0 | 297.0 | 25.0 | 0.0 | 297.0 |
| I | Metal | 7.5 | 0.0 | 197.0 | 13.0 | 0.0 | 197.0 |

(2) Production of Liner Having Fine Structure

A base liner was provided which includes layers composed of polyethylene (PE) on both surfaces of a sheet made of polyethylene terephthalate (PET) or paper, and one of the PE layers is coated with silicone to have a release surface. A mold was applied to the release surface of the base liner, and the fine structure of the mold was transferred to the base liner by heat pressing, thus producing a liner having a fine structure. The fine structure on the liner had substantially the same size as the fine structure of the mold.

(3) Formation of First Part

A water-based polyurethane solution (PUR-1: a solution composed mainly of Resamine D-6260 (Dainichiseika Color Co., Ltd.) and containing water, isopropanol, and NMP, or PUR-2: ETERNACOLL UW5002 (Ube Industries, containing water and NMP), was applied to the fine structure surface of the liner, and then excess solution was scraped off with a doctor blade or a squeegee. The liner was heated in an oven at 80 to 100° C. to volatilize water, alcohols, other organic solvents, or solvents composed of their mixture contained in the solution, thereby disposing the solid urethane resin at the bottoms of the square pyramid or square frustum structures of the fine structure.

(4) Imparting of Fine Structure and First Part to Existing Pressure Sensitive Adhesive Sheet A commercially available pressure sensitive adhesive sheet (FTA 9055 J (3M)) was provided. After releasing its liner, the pressure sensitive adhesive sheet was bonded using a heat laminator to the liner provided in the aforementioned (3) on its fine structure surface, on which the solid urethane resin had been disposed.

The samples thus obtained were evaluated for their slidability and air releasability. The results are shown in Table 2.

TABLE 2

| | Production Example 1 | | | | | | | | | | |
|---|---|---|---|---|---|---|---|---|---|---|---|
| | Examples | | | | | | | | | | |
| | Example 1-1 | Example 1-2 | Example 1-3 | Example 1-4 | Example 1-5 | Example 1-6 | Example 1-7 | Example 1-8 | Example 1-9 | Reference Example 1-1 | Reference Example 1-2 |
| Mold ID | B | B | C | C | D | H | H | I | I | — | — |
| Non-tacky part | PUR-1 | PUR-2 | PUR-1 | PUR-2 | PUR-1 | PUR-1 | PUR-2 | PUR-1 | PUR-2 | — | — |
| Slidability | 3 | 3 | 3 | 3 | 3 | 2 | 2 | 1 | 1 | 0 | 1 |
| Slidability (after bonding under pressure) | 0 | 0 | 0 | 0 | 0 | 0 | 0 | 0 | 0 | 0 | 0 |
| Air releasability | Yes | Yes | Yes | Yes | Yes | Yes | Yes | Yes | Yes | Yes | Yes |

Reference Example 1: No Formation of Non-Tacky Part

Reference Example 2: Known Example (Including Protrusions at Intervals of 300 μm, Made of Cellulose Containing Ceramic Beads)

Production Example 2

A liner (lower liner) was provided in the same manner as in Production Examples 1 (1) to (3), in which a solid polyurethane resin was disposed at the bottoms of square pyramid or square frustum structures of a fine structure. A UV curable acrylic foam adhesive precursor composed mainly of 2-ethylhexyl acrylate was applied to the fine structure surface of the liner, and then another liner (upper liner) was overlaid so that a gap of approximately 2 mm was created between the liner and the lower liner. UV irradiation was performed over the liner to cure the adhesive. The thickness of the adhesive layer thus formed was 2 mm.

The samples thus obtained were evaluated for slidability of the upper and lower surfaces. The results are shown in Table 3.

TABLE 3

| | Production Example 2 | | | | | |
|---|---|---|---|---|---|---|
| | Lower liner | | Upper liner | | Slidability | |
| | Mold ID | Main Material | Mold ID | Main Material | Lower | Upper |
| Example 2-1 | A | Paper | (Smooth liner) | PET | 1 | 0 |
| Example 2-2 | A | PET | (Smooth liner) | PET | 1 | 0 |
| Example 2-3 | B | Paper | (Smooth liner) | PET | 2 | 0 |
| Example 2-4 | B | PET | (Smooth liner) | PET | 2 | 0 |
| Example 2-5 | C | Paper | (Smooth liner) | PET | 3 | 0 |
| Example 2-6 | C | PET | (Smooth liner) | PET | 3 | 0 |
| Example 2-7 | C | PET | C | PET | 3 | 3 |
| Example 2-8 | D | Paper | (Smooth liner) | PET | 3 | 0 |
| Example 2-9 | D | PET | (Smooth liner) | PET | 3 | 0 |
| Example 2-10 | D | PET | C | PET | 3 | 3 |
| Example 2-11 | E | Paper | (Smooth liner) | PET | 3 | 0 |
| Example 2-12 | E | PET | (Smooth liner) | PET | 3 | 0 |
| Example 2-13 | G | Paper | (Smooth liner) | PET | 3 | 0 |
| Example 2-14 | G | PET | (Smooth liner) | PET | 3 | 0 |
| Example 2-15 | G | PET | No 6 | PET | 3 | 3 |
| Reference Example 2-1 | (Smooth liner) | Paper | (Smooth liner) | PET | 0 | 0 |
| Reference Example 2-2 | (Smooth liner) | PET | (Smooth liner) | | 0 | 0 |

Production Example 3

A liner was prepared in the same manner as in Production Examples 1 (1) to (3), in which a solid polyurethane resin was disposed at the bottoms of square pyramid or square frustum structures of a fine structure. A thermosetting acrylic adhesive precursor (containing methyl ethyl ketone as a solvent) was applied to the fine structure surface of the liner, and then dried in an oven. The thickness of the adhesive layer thus formed was approximately 35 μm. Another liner was then laminated onto it using a heat laminator.

The samples thus obtained were evaluated for slidability of upper and lower surfaces. The results are shown in Table 4.

TABLE 4

| | Production Example 3 | | | | | |
|---|---|---|---|---|---|---|
| | Lower liner | | Upper liner | | Slidability | |
| | Mold ID | Main Material | Mold ID | Main Material | Lower | Upper |
| Example 3-1 | A | PET | (Smooth liner) | PET | 1 | 0 |
| Example 3-2 | A | PET | A | PET | 1 | 1 |
| Example 3-3 | B | Paper | (Smooth liner) | Paper | 2 | 0 |
| Example 3-4 | B | Paper | B | Paper | 2 | 2 |
| Example 3-5 | B | PET | (Smooth liner) | PET | 2 | 0 |
| Example 3-6 | B | PET | B | PET | 2 | 2 |
| Example 3-7 | C | PET | (Smooth liner) | PET | 3 | 0 |
| Example 3-8 | C | PET | C | PET | 3 | 3 |
| Example 3-9 | D | Paper | (Smooth liner) | Paper | 3 | 0 |
| Example 3-10 | D | Paper | D | Paper | 3 | 3 |
| Example 3-11 | D | PET | (Smooth liner) | PET | 3 | 0 |
| Example 3-12 | D | PET | D | PET | 3 | 3 |
| Example 3-13 | E | Paper | (Smooth liner) | Paper | 3 | 0 |
| Example 3-14 | E | Paper | (E | Paper | 3 | 3 |
| Example 3-15 | E | PET | (Smooth liner) | PET | 3 | 0 |
| Example 3-16 | E | PET | E | PET | 3 | 3 |
| Reference Example 3-1 | (Smooth liner) | PET | (Smooth liner) | PET | 0 | 0 |
| Reference Example 3-2 | (Smooth liner) | Paper | (Smooth liner) | Paper | 0 | 0 |

Production Example 4

A liner including a sheet made of PET and having a fine structure on its release surface was made in the same manner as in Production Example 1 (1) and (2). An acrylic resin solution (a solution of VONCOAT 40-418EF (DIC), solid content: 7% or 30%) or a water-based polyurethane solution (solid content: 7% or 30%) was applied onto the fine structure surface of the liner, and then the excess solution was scraped off with a doctor blade or squeegee. The solvent was volatilized by heating in an oven at 80 to 100° C., thereby disposing the solid resin composing the first part at the bottoms of the square pyramid or square frustum structures of the fine structure. A solution of acrylic adhesive was applied to the fine structure surface of the liner, and then dried in an oven. The thickness of the adhesive layer thus formed was approximately 35 μm. Another liner (PET) was then laminated onto it using a heat laminator.

The samples thus obtained were evaluated for slidability and visibility of the first part. The results are shown in Table 5.

TABLE 5

Production Example 4

| | Non-tacky part | | | | |
|---|---|---|---|---|---|
| | Material | Solid content of coating solution | Adhesive layer Material | Slidability | Visibility |
| Example 4-1 | Acrylic resin | 7% | Acrylic adhesive | 2 | Not observed |
| Example 4-2 | Acrylic resin | 30% | | 3 | Not observed |
| Comparative Example 4-1 | Polyurethane | 7% | | 2 | Not observed |
| Comparative Example 4-2 | Polyurethane | 30% | | 3 | Not observed |

Refractive index:
Acrylic adhesive 1.475
Acrylic resin 1.483
Polyurethane 1.530

Production Example 5

A liner having a fine structure was made according to Production Example 1 (2) using a mold (mold ID: F) made according to Production Example 1 (1). Subsequently, a liner was prepared in the same manner as in Production Example 1 (3), in which a solid polyurethane resin composing the first part was disposed at the bottoms of the square pyramid or square frustum structures of the fine structure. At this time, the size of the first part was adjusted by repeatedly applying the polyurethane solution or adjusting the solid content of the polyurethane solution. A solution of acrylic adhesive was applied to the fine structure surface of the liner, and then dried in an oven. The thickness of the adhesive layer thus formed was approximately 35 μm. Subsequently, a black polyvinyl chloride film of thickness 100 μm having a primer layer on its adhesive surface was laminated onto it using a heat laminator.

The fine structures formed on the mold used, the liner produced, and the pressure sensitive adhesive surface of the sample after releasing the liner were observed using a microscope, and their dimensions were measured. As a result of this, it was confirmed that the structures of the mold used and the pressure sensitive adhesive surface of the sample were substantially the same.

The samples thus obtained were evaluated for the size of the first part, slidability, and peeling strength. The results are shown in Table 6.

TABLE 6

Production Example 5

| | Polyurethane solution | | | | | | Peeling |
|---|---|---|---|---|---|---|---|
| | Number of application times | Solid content (%) | Height of non-tacky part (%) | Dynamic friction force (N) | Dynamic friction force (N/cm$^2$) | Dynamic friction coefficient $\mu_o$ | strength (48 H) (N/10 mm) |
| Example 5-1 | 1 | 3 | 15 | 2.07 | 0.05 | 1.05 | 5.70 |
| Example 5-2 | 1 | 10 | 36 | 1.69 | 0.04 | 0.86 | 4.32 |
| Example 5-3 | 1 | 30 | 46 | 1.66 | 0.04 | 0.84 | 4.47 |
| Example 5-4 | 2 | 30 | 48 | 1.58 | 0.04 | 0.81 | 4.26 |
| Example 5-5 | 3 | 30 | 50 | 1.15 | 0.03 | 0.59 | 3.86 |
| Example 5-6 | 4 | 30 | 54 | 0.86 | 0.02 | 0.44 | 2.93 |
| Example 5-7 | 5 | 30 | 70 | 0.68 | 0.02 | 0.35 | 1.02 |
| Comparative Example 5-1 | 0 | — | 0 | 5.36 | 0.13 | 2.73 | 9.56 |
| Comparative Example 5-2 | (Smooth liner) | | | — | — | — | 10.67 |
| Reference Example 5-1 | Known Product 1 | | | 2.48 | 0.06 | 1.26 | — |
| Reference Example 5-2 | Known Product 2 | | | 2.26 | 0.06 | 1.15 | — |

The invention claimed is:

1. An adhesive sheet comprising an adhesive layer with a structure on a surface thereof, wherein
the structure comprises a plurality of cone or frustum structures,
the cones or frustums have two or more parts joined to each other via an interface,
a first part present on a top of the cones or frustums is formed from a non-adhesive or a weak adhesive material, wherein the weak adhesive material is an adhesive having a storage modulus of elasticity of $3\times10^5$ Pa or greater as measured at a frequency of 1 Hz, and
a second part present below the first part is formed from a strong adhesive material, wherein the strong adhesive material is an adhesive having a storage modulus of elasticity of less than $3\times10^5$ Pa as measured at a frequency of 1 Hz,
wherein the first part and the second part of the cones or frustums are adjacent to each other, and a difference between a refractive index of the first part and a refractive index of the second part is within 1%.

2. The adhesive sheet according to claim 1, wherein an angle θ formed between a side surface and a bottom surface of the cones or frustums is 8° or greater.

3. The adhesive sheet according to claim 1, wherein a height of the first part is in a range from 10% to 90% of the cones or frustums when a height of the cones or frustums is 100%.

4. The adhesive sheet according to claim 1, wherein in the fie structure, the longest distance between centers of two adjacent cones or frustums is 300 μm or less.

5. The adhesive sheet according to claim 1, wherein the adhesive sheet comprises 16 or more of the cones or frustums per 1 mm² of the surface of the adhesive layer.

6. The adhesive sheet according to claim 1, wherein the first parts of the cones or frustums contain polyurethane, poly(meth)acrylate, cellulose, silicone, an amine-based resin, a fluororesin, or polyvinyl chloride.

7. The adhesive sheet according to claim 1, wherein the first part of the cones or frustums comprises a material having a storage modulus of elasticity (G') of $3\times10^5$ Pa or greater as measured at a frequency of 1 Hz at normal temperature.

8. The adhesive sheet according to claim 1, wherein the adhesive sheet has a dynamic friction coefficient of 1.10 or less, when tested according to JIS K 7125.

9. The adhesive sheet according to claim 1, wherein the adhesive sheet has a 180° peel adhesion strength of 1.0 N/10 mm or greater after 48 hours of adhesion, when tested under conditions of a temperature of 23° C. and a tensile speed of 200 mm/minute.

10. The adhesive sheet according to claim 1, wherein the first part and second part are joined so as to be in contact with each other via a distinct interface.

11. The adhesive sheet according to claim 1, wherein the non-adhesive material has a strength of adhesiveness to the same adherend that is weaker than that of the weak adhesive material, and the weak adhesive material has a strength of adhesiveness to the same adherend that is weaker than that of the strong adhesive material.

12. The adhesive sheet according to claim 1, wherein an angle θ formed between a side surface and a bottom surface of the cones or frustums is 8° or greater, a height of the first part is in a range from 10% to 90% of the cones or frustums when a height of the cones or frustums is 100%, in the structure, the longest distance between centers of two adjacent cones or frustums is 300 μm or less, and the adhesive sheet comprises 16 or more of the cones or frustums per 1 mm² of the surface of the adhesive layer.

* * * * *